May 9, 1967  A. H. BAHNSON, JR., ETAL  3,318,078
DOFFER-DONNER MECHANISM FOR SPINNING
MACHINES AND THE LIKE
Filed Sept. 21, 1961  12 Sheets-Sheet 1

May 9, 1967 A. H. BAHNSON, JR., ETAL 3,318,078
DOFFER-DONNER MECHANISM FOR SPINNING
MACHINES AND THE LIKE
Filed Sept. 21, 1961 12 Sheets-Sheet 6

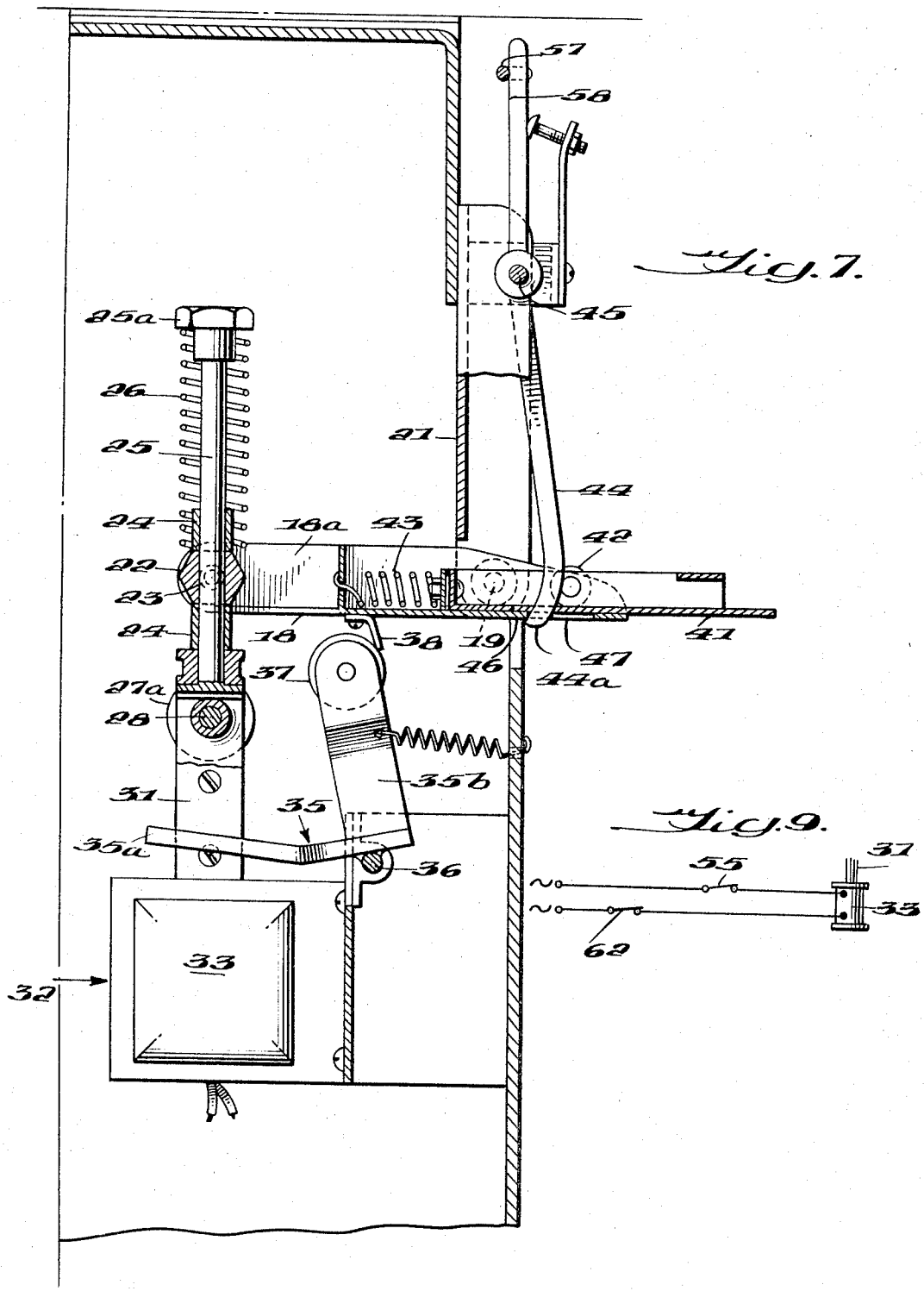

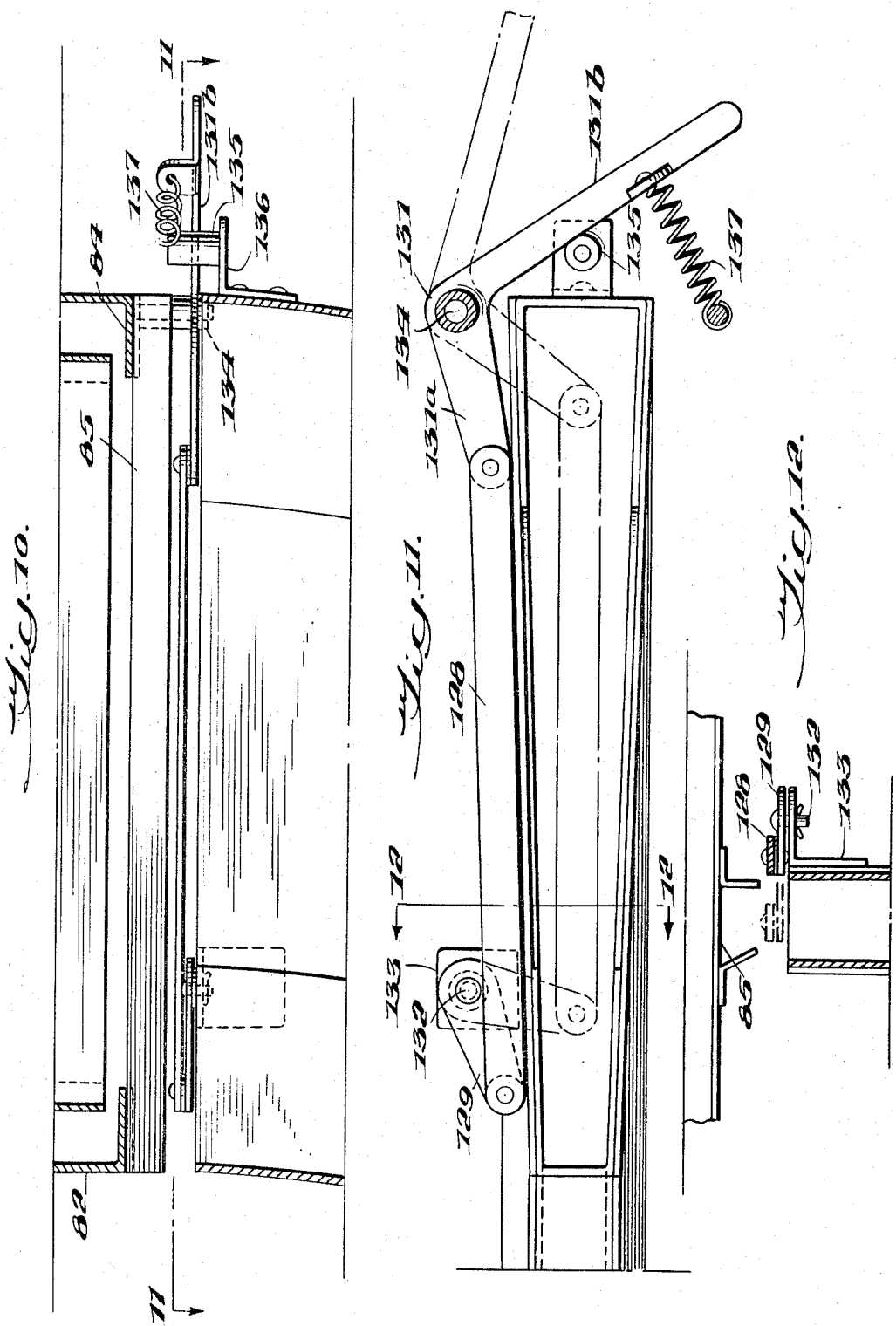

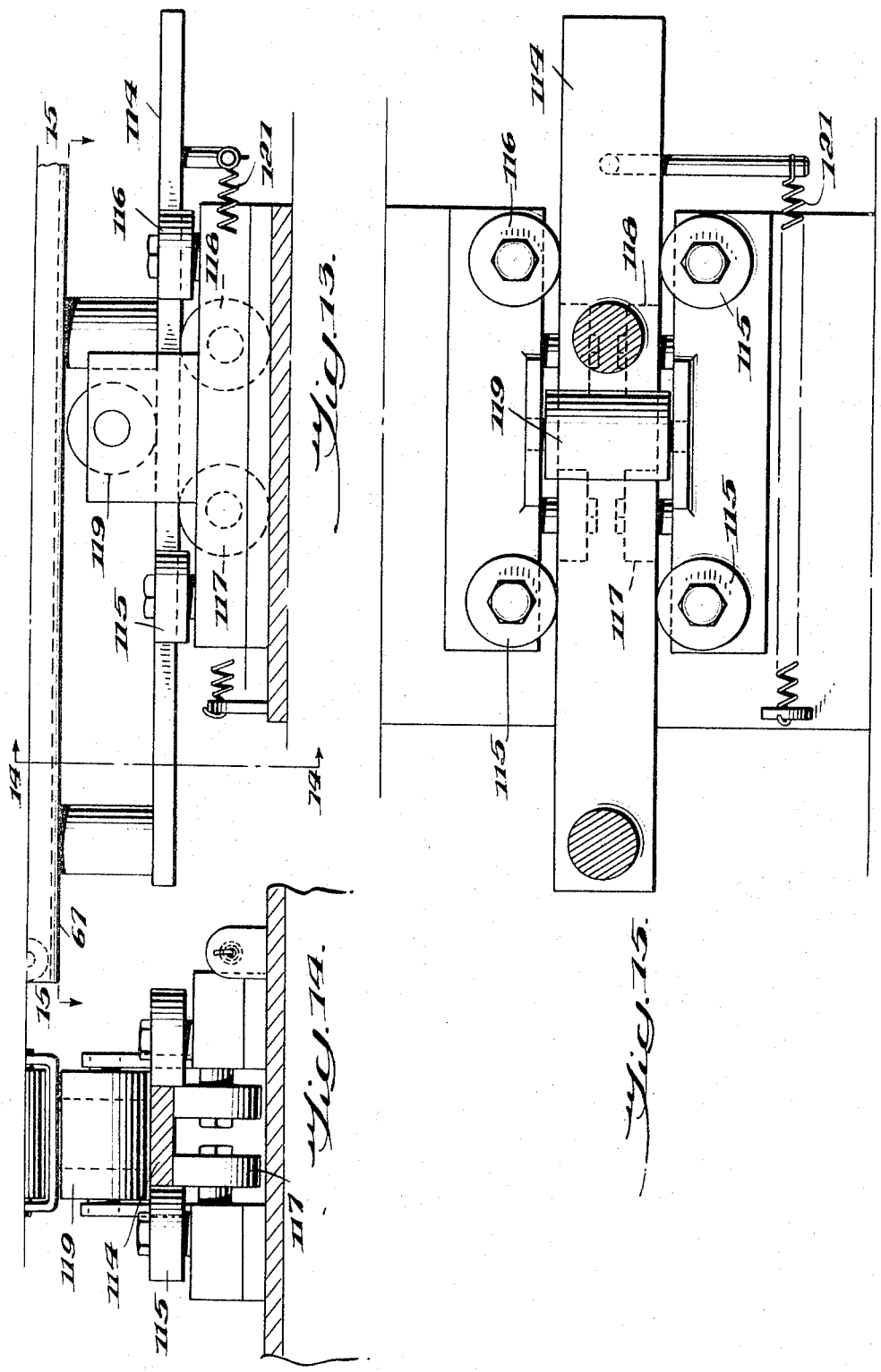

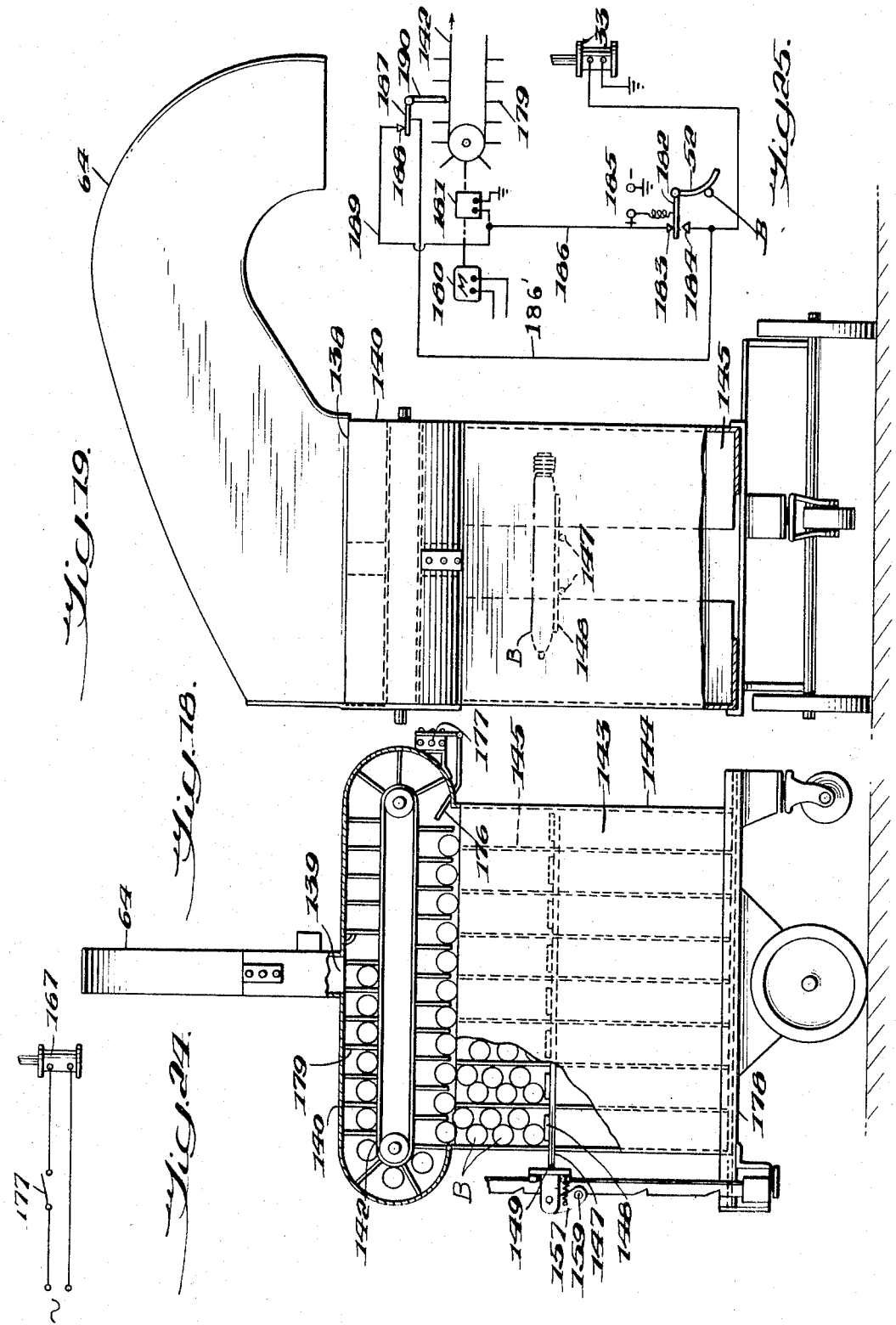

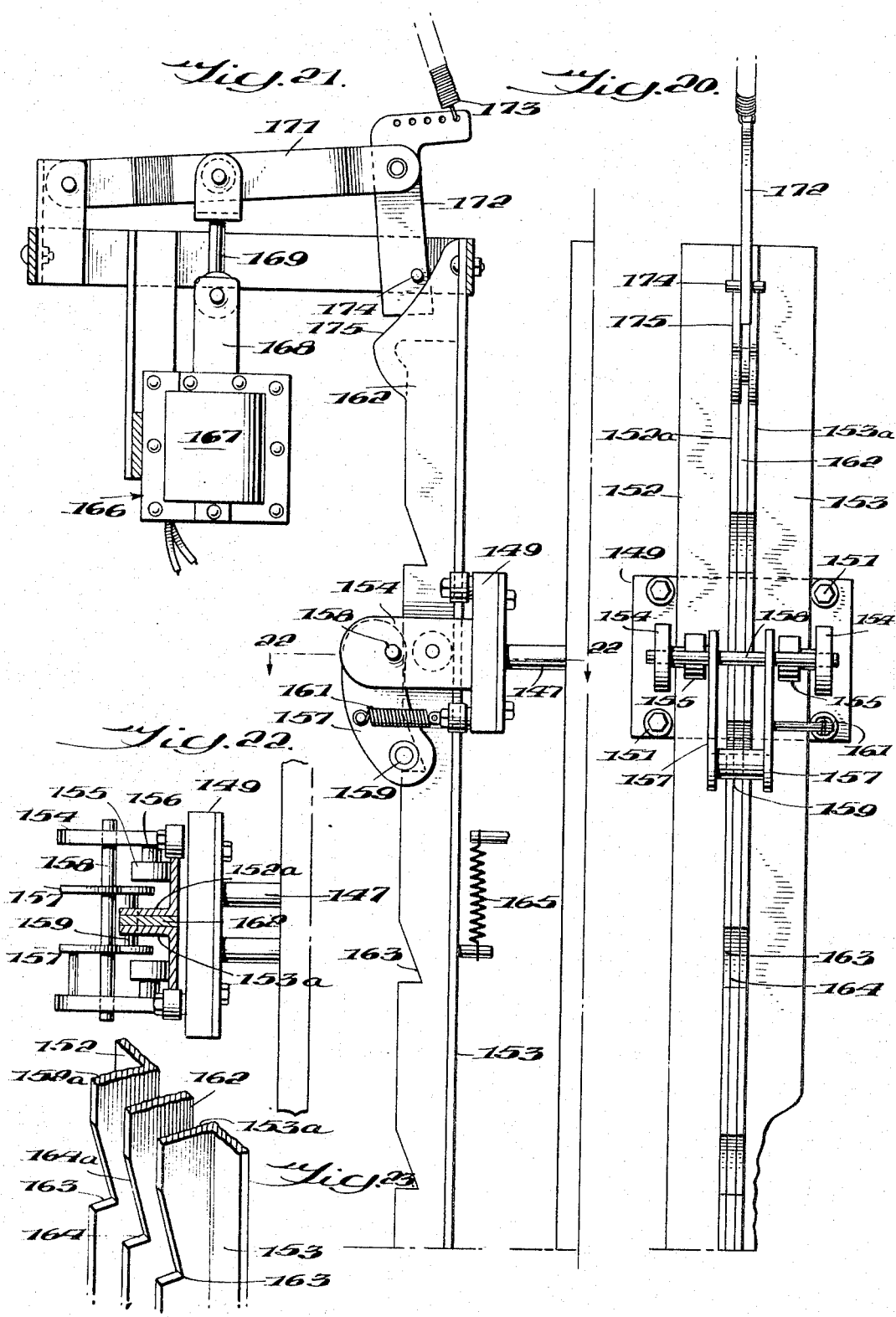

United States Patent Office 3,318,078
Patented May 9, 1967

3,318,078
DOFFER-DONNER MECHANISM FOR SPINNING MACHINES AND THE LIKE
Agnew H. Bahnson, Jr., and James F. King, Jr., Winston-Salem, N.C., assignors to The Bahnson Company, Winston-Salem, N.C., a corporation of North Carolina
Filed Sept. 21, 1961, Ser. No. 139,650
14 Claims. (Cl. 57—53)

This invention relates to apparatus for automatically doffing full bobbins from spinning machines and the like and donning empty bobbins on the spindles from which the full bobbins have just been removed, the doffing and donning operations taking place in a spindle-by-spindle manner as the apparatus travels from one end of the machine to the other.

A principal object of the invention is to provide an improved doffing-donning apparatus wherein the doffing and donning operations take place in an expeditious manner without requiring any manual handling of the bobbins.

A more specific object is to provide an improved doffing apparatus in which the doffing mechanism is controlled by a bobbin feeler member adapted to engage the side of a full bobbin and initiate the doffing operation.

Another specific object is to provide an improved donning apparatus in which the donning mechanism is controlled by a spindle feeler member adapted to engage the spindle and initiate the donning operation.

A further object is to provide a donning apparatus which includes a magazine holding a supply of empty bobbins which are fed from the magazine via a transfer chute to the donning point, the magazine storing the empty bobbins in compartments and the magazine being shifted in a step by step manner automatically so as to discharge the empty bobbins from the compartments in succession into the chute.

Still another object of the invention is to provide an improved arrangement for handling the full bobbins after being doffed and which includes a transfer belt and container provided with a movable floor by which the full bobbins are deposited in different compartments of the container in an orderly manner and are all oriented in the same direction.

The foregoing as well as other objects and advantages of the invention will become more apparent from the following detailed description of one preferred embodiment thereof and from the accompanying drawings wherein:

FIG. 7 is a vertical section on line 7—7 of FIG. 4;

FIG. 9 is a circuit diagram showing the energizing circuit for the solenoid of the doffer mechanism;

FIG. 10 is a vertical section of adjacent parts of the bobbin magazine and transfer chute of the donner mechanism;

FIG. 11 is a horizontal section on line 11—11 of FIG. 10;

FIG. 12 is a vertical section on line 12—12 of FIG. 11;

FIG. 13 is a vertical section of the lower portion of the slidable transfer chute;

FIG. 14 is a vertical section on line 14—14 of FIG. 13;

FIG. 15 is a horizontal section on line 15—15 of FIG. 13;

FIG. 18 is a side view partly in elevation and partly in section of the transfer belt and container unit into which full bobbins are deposited after being doffed;

FIG. 19 is an elevational view taken at a right angle to FIG. 18;

FIG. 20 is an end view drawn to an enlarged scale of the mechanism utilized for lowering the floor of the container in a step-by-step manner;

FIG. 21 is a view in side elevation of the floor lowering mechanism of the container;

FIG. 22 is a horizontal section on line 22—22 of FIG. 21;

FIG. 23 is an exploded view of the three rail elements which are notched at vertical intervals to provide the several stop points for the lowerable container floor;

FIG. 24 is a circuit diagram showing the energizing circuit for the solenoid controlling operation of the container floor lowering mechanism; and FIG. 25 is also a circuit diagram showing the arrangement for controlling movement of the transfer belt in a step-by-step manner coordinated to operation of the doffer mechanism.

General

Figure 1:
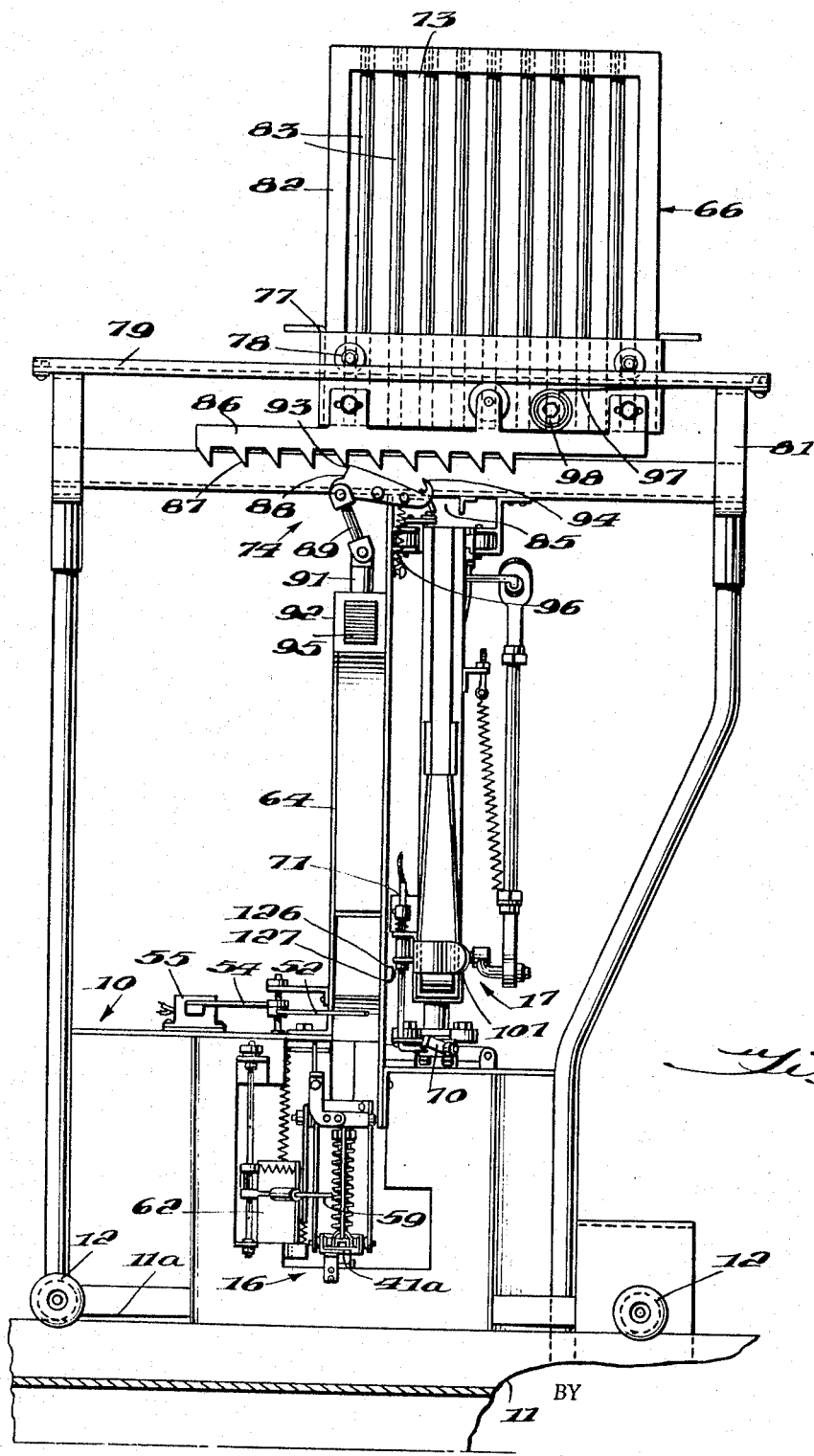
FIG. 1 is a view in front elevation of the doffer-donner apparatus as seen from the side of the spinning frame.
Figure 2:
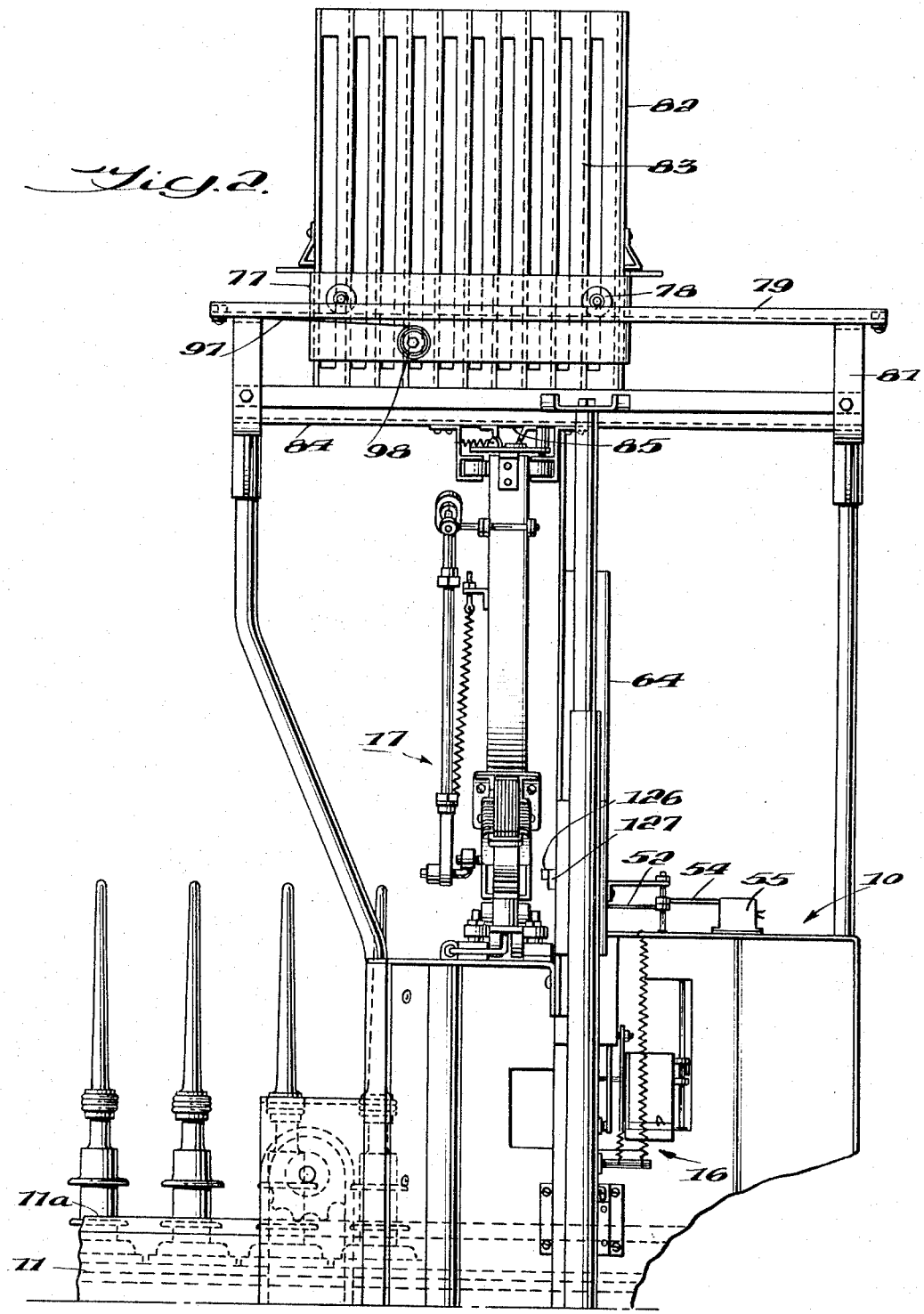
FIG. 2 is a rear elevation of the doffer-donner apparatus looking in the direction of the spinning frame.
Figure 3:
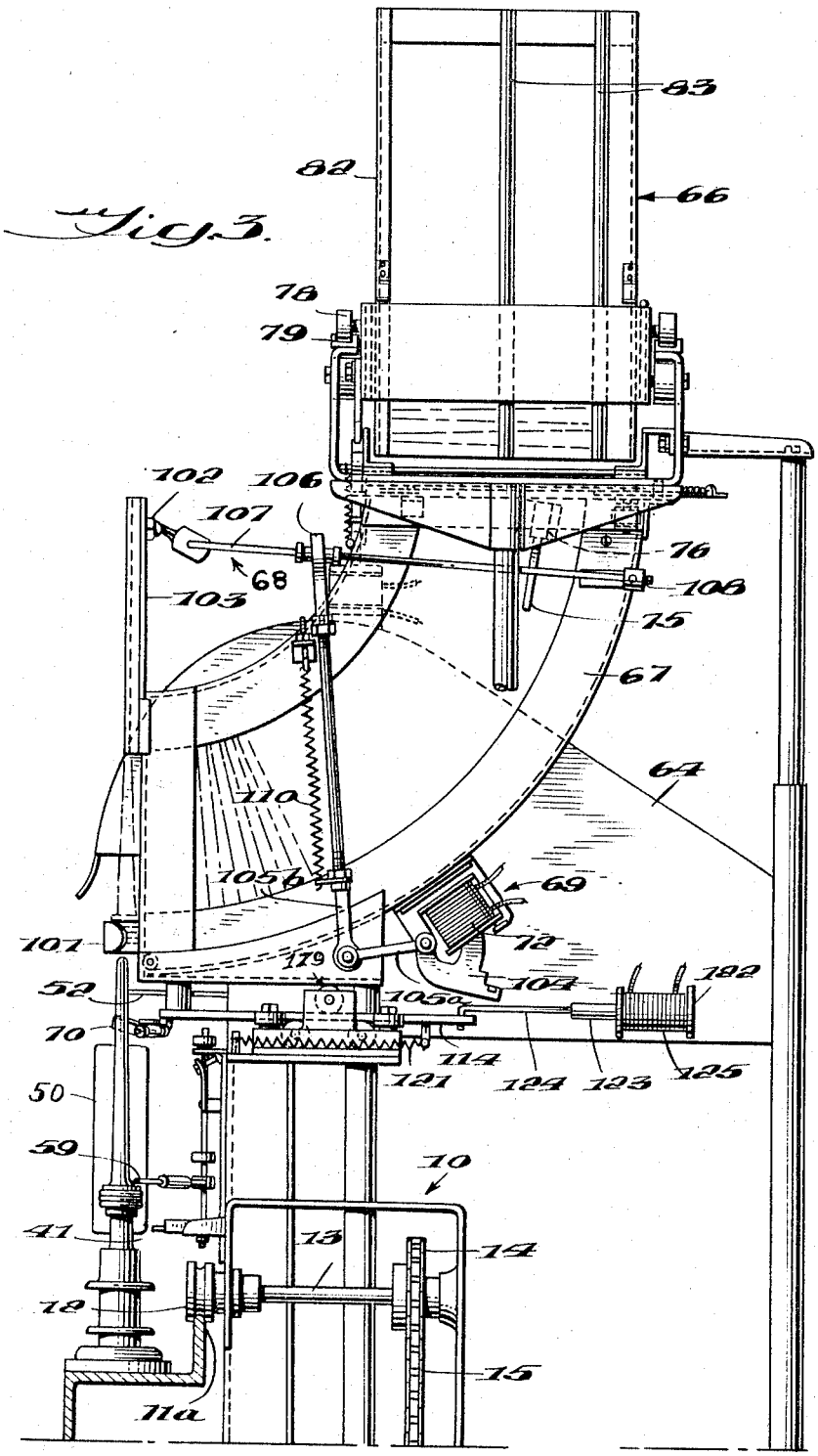
FIG. 3 is a view in side elevation of the doffer-donner apparatus.
Figure 4:
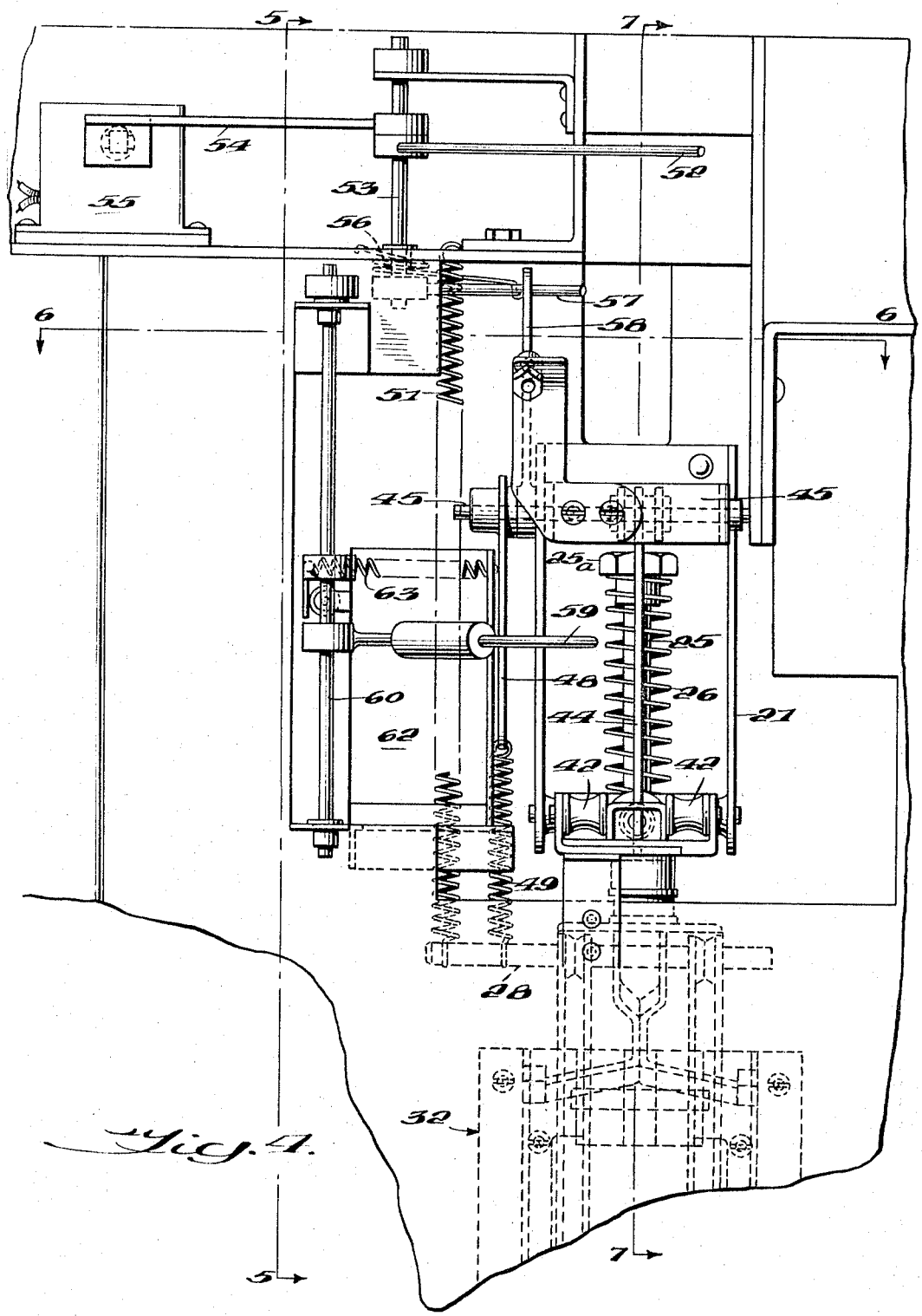
FIG. 4 is a front view of a portion of the doffer mechanism drawn to an enlarged scale.

With reference now to FIGS. 1–3, the improved doffer-donner apparatus includes a supporting frame 10 which is adapted to be attached to the spinning machine and to travel from one end of the latter to the other. In the interest of simplifying the drawings, the details of the spinning machine have been omitted except for the spindle rail 11, and frame 10 includes spaced grooved wheels 12 which establish a rolling contact with an upstanding flange 11a to spindle rail 11. To propel the doffer-donner apparatus along the spinning machine, one of the wheels 12 is secured to a drive shaft 13 on which is mounted a driving sprocket 14 and sprocket chain 15 which leads to another driving sprocket and associated electric motor drive not otherwise detailed.

The frame 10 is adapted to run continuously along the spinning machine starting at one end and progressing along the same as to doff the full bobbins in succession and don empty bobbins, also in succession, on the spindles from which the full bobbins have been removed.

The doffer mechanism is indicated generally by numeral 16 and the donner mechanism which is mounted adjacent to it is likewise generally indicated by numeral 17.

Doffer

The doffer consists principally of a lifter mechanism which is arranged to move into a position beneath the base of the bobbin and then exert a sudden upward force so as to drive the bobbin in an upward direction from its seat on the spindle, the bobbin being driven upward with such force as to enter a chute and be guided into a receptacle. This lifter mechanism is detailed at a larger scale in FIGS. 4–8. As shown in these views, the lifter mechanism includes a U-shaped channel member 18 which is mounted pivotally intermediate the ends thereof on pivot bearings 19 carried at the lower end of a support 21. The rear end of the channel member 18 includes a cross piece 22 of hexagonal configuration which extends between and is secured to the channel flanges 18a and is capable of a rotational movement about its axis. Cross piece 22 includes a transverse bore 23 and oppositely extending guide sleeves 24 in alignment with the bore 23 for slidably receiving a shaft 25. Surrounding the upper portion of shaft 25 is a helical loading spring 26, the upper end of this spring bearing against a head 25a at the top of shaft 25 and the lower end of the spring 26 bearing against the surface of cross piece 22.

The lower end of shaft 25 is secured to the web part of an inverted U-shaped bracket 27 and a cross shaft 28 passes through aligned apertures in the arms 27a of bracket 27 and apertures in the upper end of the reciprocatable armature 31 of a solenoid 32 thus coupling the shaft 25 with armature 31 so as to pull the former downward and compress spring 26 when the solenoid coil 33 is energized.

During the first part of the compression of spring 26 caused by downward movement of shaft 25, the U-shaped channel member 18 is unable to rotate about its pivot axis 19 because of the blocking action of release assembly 34. The latter is composed of a spring biased forked member 35 mounted pivotally on a pivot bearing 36, the arms 35a of the fork reaching to a point on each side of the solenoid armature 31 so as to be engaged and tripped by the cross shaft 28 after the latter has reached a given position in its downward movement when the solenoid is energized. Engagement between shaft 28 and the fork arms 35a causes the fork to pivot counterclockwise from the position shown in FIGS. 5–8 and shift a roller 37 carried at the upper end of an extension arm 35b on the fork from its locking position beneath and engaged with an underpart 38 of the U-shaped channel member 18 to a released position whereupon the force which had been stored in spring 26 by its compression is then suddenly released to thereby impart a corresponding sudden pivotal movement to the channel member 18.

Figure 5:
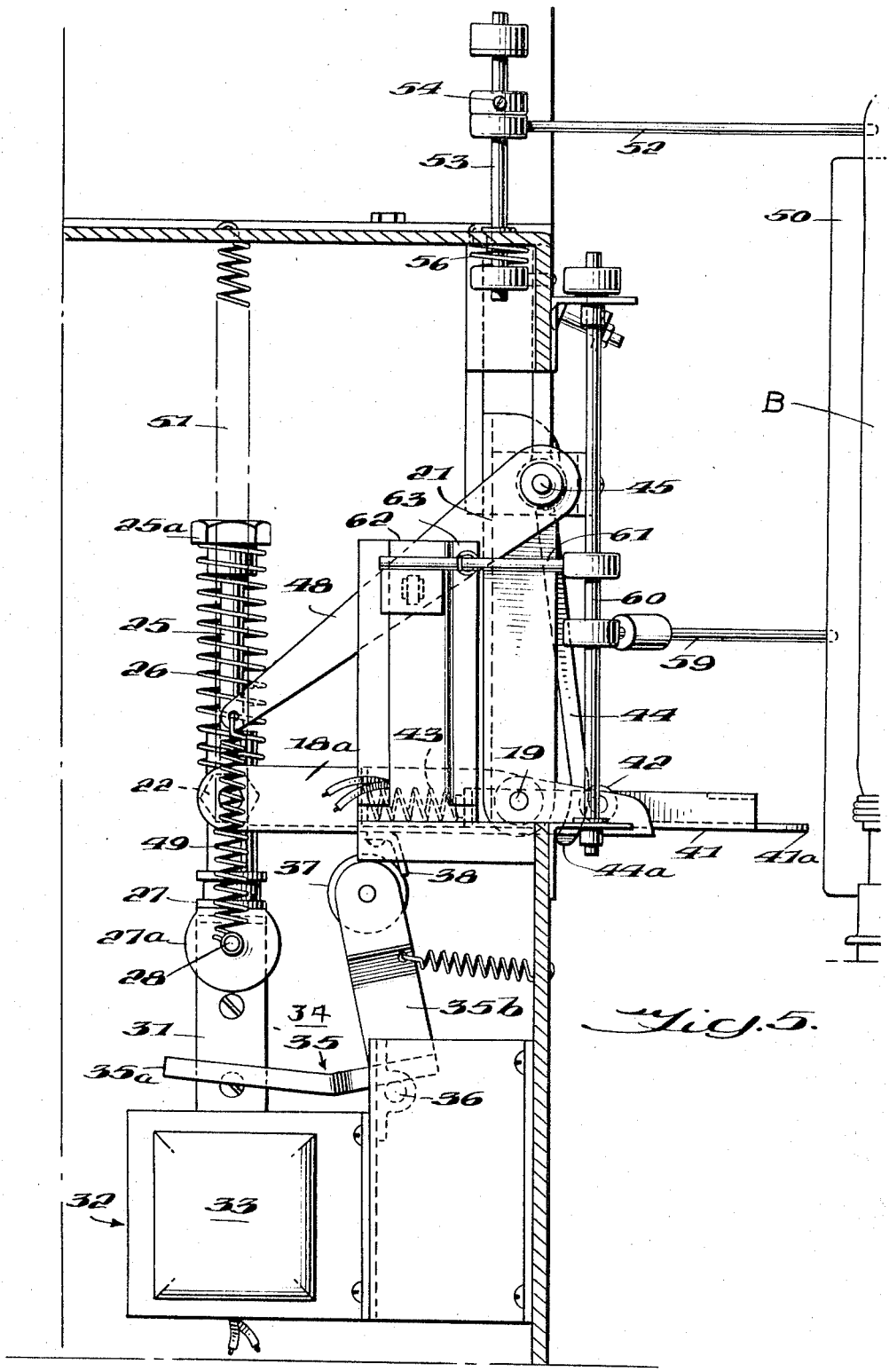
FIG. 5 is a vertical sectional view on line 5—5 of FIG. 4.
Figure 6:
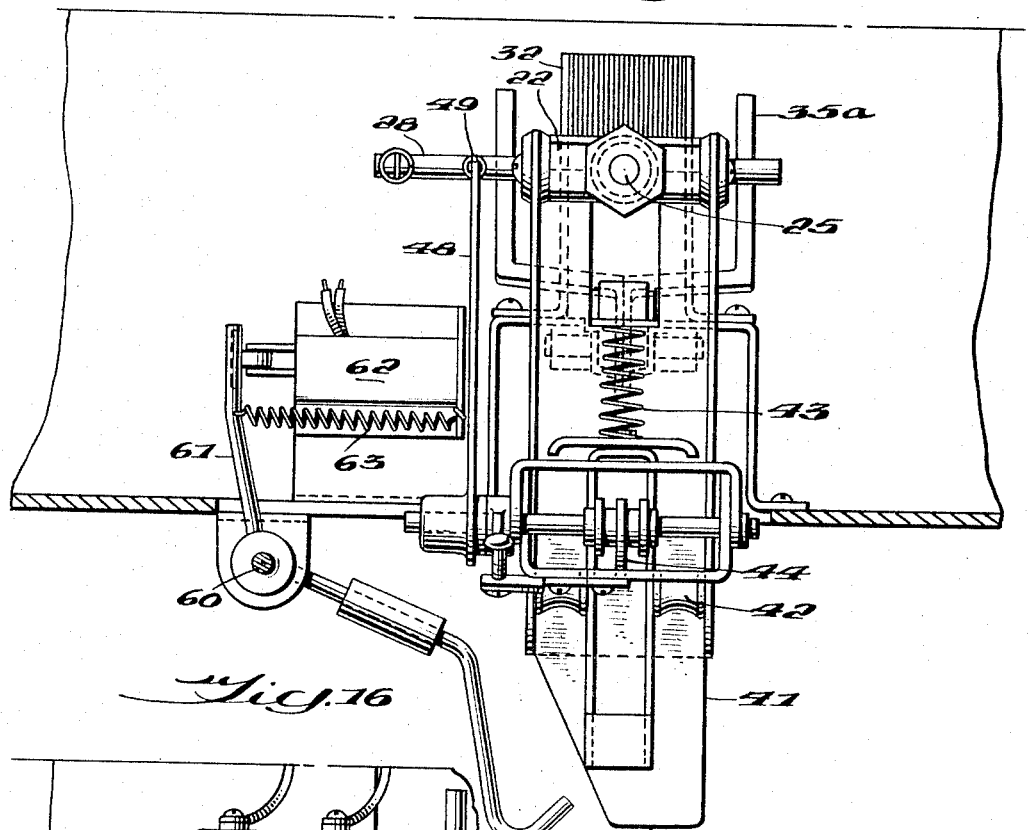
FIG. 6 is a horizontal section taken on line 6—6 of FIG. 4.

The U-shaped channel member 18 itself does not actually engage under the butt of the full bobbin to effect the necessary lift-off motion but rather it is preferred to utilize a slide for this purpose. The slide 41 is arranged for sliding movement on and longitudinally of channel member 18 and is guided by rollers 42 rotatably mounted on the flanges 18a of channel member 18 and which roll in contact with the upper face of the slide. As shown in FIGS. 5–7 a tension spring 43 having one end anchored to channel member 18 and the other end secured to the rear end of slide 41 serves to hold the slide in its retracted position, and wherein the front edge 41a of the slide which is adapted to be slid under the butt of the full bobbin to doff the same will be located sufficiently rearward to clear the separators which are located between spindles on a spinning machine.

In order to extend the slide 41 from its retracted position, it will be seen from FIGS. 5 and 7 that a lever arm 44 projects downwardly from a pivot shaft 45, the toe 44a of this lever being entered into a slot 46 in the base of slide 41a and a coinciding slot 47 in the channel member 18. The upper end of lever 44 is connected to the horizontal pivot shaft 45 and another lever 48 also joined to this pivot shaft 45 and which extends obliquely downward and rearwardly as shown in FIG. 5. The lower end of lever 48 is secured to the upper end of a tension spring 49 as shown in FIG. 5 and the lower end of spring 49 is secured to cross shaft 28 which as previously explained is drawn down simultaneously with solenoid armature 31. Thus as shaft 25 moves downwardly upon energization of solenoid coil 33, lever 48 rotates pivot shaft 45 counterclockwise as viewed in FIG. 5 and causes the toe 44a of lever 44 to shift slide 41 to its extended position where it underlies the butt of the bobbin to be doffed. A tension spring 51 having the upper end anchored and the lower end secured to the cross shaft 28 serves to bias the solenoid armature 31 and all components movable therewith in the upward position so that restoration to this position takes place whenever solenoid coil 33 is deenergized.

Energization of solenoid coil 33 is controlled by means of a feeler member 52 which is pivotally mounted on a shaft 53 for rotation about a vertical axis and is so disposed as to be engaged by the top portion of the full bobbin B which is about to be doffed. When feeler member 52 is contacted by the bobbin, it will be rotated thus turning shaft 53 and also effecting a corresponding movement of an arm 54 attached to the shaft and which serves to actuate the contacts of switch 55 to a closed position against the biasing action of a restoring torsion spring 56 surrounding shaft 53 and having one end secured to a third arm 57 on shaft 53 and which serves to reopen the contacts of switch 55 after a full bobbin has been doffed and solenoid coil 33 has been deenergized.

In order to ensure that solenoid coil 33 will not be deenergized prematurely before the lifter mechanism has accomplished its function in driving the full bobbin upward from the spindle, and also to prevent the bobbin feeler arm 52 from interfering with upward movement of the full bobbin, it is preferred to provide a holding arrangement for the bobbin feeler 52 and which also keeps the contacts of switch 55 closed. This holding device is comprised of another arm 58 secured to pivot shaft 45 and which is engageable with arm 57. Thus, when solenoid coil 33 is energized by closure of the contacts in switch 55 and hence pulls the armature assembly downward, pivot shaft 45 is rotated to impart a corresponding rotative movement to arm 58 which then engages arm 57 to hold the latter and hence the bobbin feeler arm 52 in a position such as will not interfere with ejection of the full bobbin from the spindle. The contacts of switch 55 are thus also maintained in a closed position to keep solenoid coil 33 energized since switch arm 54 is also held in the same position to which it had been moved by actuation of the bobbin feeler arm 52.

After the slide 41 has been shifted to the position beneath the bobbin butt and latch roller 37 is subsequently released from the holding position beneath the channel member 18, the latter and hence also the slide 41 thereon are caused to pivot suddenly with a great amount of force of a magnitude generally equal to the potential energy built up by compression of spring 26 thus driving the full bobbin up into the mouth of chute 64 through which it is then carried by its own momentum and transferred to an endless conveyor to be later described and from which the full bobbins are deposited in an orderly manner in layers in a box-like receptacle.

As the supporting structure for the doffer mechanism continues its movement along the spinning machine after having doffed a full bobbin, the invention provides an arrangement for retracting slide 41 and deenergizing solenoid coil 33 and otherwise restoring the doffer components to their starting position ready for another doffing cycle. This part of the mechanism includes a feeler arm 59 secured to shaft 60 mounted for rotation about a vertical axis, the feeler arm 59 being placed so as to be engaged by the edge of the spacer 50 between spindles. These spacers are standard equipment on spinning machines and are used for compartmentizing the individual spindles so that the thread being wound on each spindle will not interfere with the winding operation on adjacent spindles. A switch arm 61 also secured to shaft 60 is actuated as the feeler arm 59 is actuated by engagement with the spacer 50 and this switch arm serves to actuate the contacts of a switch 62 from a normally closed position, attributable to the biasing action of spring 63 attached to arm 61, to an open position thus opening the energization circuit for solenoid coil 33. The energizing circuit for solenoid coil 33 and the arrangement of switches 55 and 62 in this circuit is shown in FIG. 9.

As coil 33 is deenergized, armature 31 is released and is raised by the restoring force in stretched spring 51 to the initial position. Also, lever 44 is simultaneously shifted to retract slide 41 to a position clearing the spacer so as not to interfere with movement of the doffer mechanism to the next bobbin to be doffed.

Donner

The donner mechanism as shown more particularly in FIGS. 1–3 and 10–15 is composed of a magazine 66 for empty bobbins, a chute 67 for effecting transfer of the bobbins from the magazine to the donning position and a solenoid actuated plunger mechanism 68 adapted to strike the top of each empty bobbin to effect its release from the donning position so as to enable the bobbin to drop down in place over the spindle. For controlling the plunger actuating solenoid 69, a donner feeler 70 is positioned in the path of the line of spindles, this feeler being adapted to be actuated by the empty spindle and controlling operation of the contact of a switch 71 connected in the energizing circuit of the plunger actuating solenoid coil 72.

Magazine 66 is provided with a plurality of compartments 73 arranged in side-by-side relation, these compartments being arranged to be brought successively into a position registering with the upper feed-in end of the chute 67 so as to deliver the empty bobbins stored therein into the chute. A solenoid controlled step mechanism 74 is associated with the magazine and is controlled by a feeler 75 located on the chute and adapted to be actuated by the bobbins in the chute so that after the last of a particular group of bobbins from one magazine compartment has passed feeler 75 in the chute 67 and the feeler has been released it functions to close contacts of a switch 76 which in turn energizes the step mechanism for the magazine whereby the latter is then shifted to bring the next full compartment in the magazine into registry with the upper end of the chute so as to discharge the bobbins from the compartment into the chute.

The traveling magazine 66 includes a carriage 77 provided with wheels 78 which are adapted to run on a horizontal trackway 79 located above the transfer chute 67 and which is supported on upright frame members 81. Supported upon the carriage structure is a magazine housing 82 which is divided off by partition members 83 into a plurality of compartments 73 each of which is adapted to be filled with empty bobbins, the bobbins lying on their sides in contact with each other and with their top ends inclined slightly downward. Below the trackway 79 along which the magazine housing moves is a plate 84 which has a transverse slot 85 located above and in registry with the upper feed-in end of the chute 67 and having a configuration generally corresponding with the lower open end of each compartment so as to effect transfer of the bobbins stored in a particular compartment to the chute 67 each time the magazine is stepped along the trackway by a distance equal to the distance between adjacent compartments.

The step mechanism 74 for the magazine includes a rack 86 attached thereto, the rack having downwardly directed teeth 87 with a longitudinal spacing generally equal to the spacing between compartments in the magazine. A stepping lever 88 pivotally mounted intermediate its ends is connected by linkage 89 to the armature element 91 of a solenoid 92 and includes a hold and release toe 93 at one end and a catch toe 94 at the other end. Each time the solenoid coil 95 is energized, lever 88 is shifted counterclockwise as viewed in FIG. 1 to thus release toe 93 from its holding contact with one tooth on rack 86 and permit the carriage 77 to shift to the right by a distance equal to the distance between adjacent rack teeth 87 where it is then stopped by action of the catch toe 94 which is moved up to engage another tooth on the rack. When solenoid coil 95 is deenergized, a biasing spring 96 restores lever 88 to its original position whereupon the first mentioned toe 93 reengages a tooth 87 on rack 86 to thus hold the carriage 77 against further stepping movement until the solenoid coil 95 is energized again.

The force for shifting the carriage 77 in a step-by-step manner is produced by a roll-up spring in the form of a strip 97 wound upon a spool 98 mounted upon the carriage. One end of the strip 97 is anchored at the right end of the track 79 as viewed in FIG. 1 and since the spring strip tends to wind itself upon the spool, it will naturally tend to pull the carriage to the right as it rewinds. This movement is of course controlled by the step mechanism which has been described.

Energization of the magazine stepping solenoid coil 95 is controlled by the switch 76 the contacts of which are normally held in an open position by means of the feeler 75 positioned on chute 67 and which is engaged by empty bobbins in the chute. When the last bobbin from any one compartment of the magazine has progressed downwardly so as to pass this feeler and thereby release the same, the contacts of switch 76 close thus completing an energizing circuit to the solenoid coil 95 of the stepping mechanism and the latter goes through one operating cycle to cause the magazine 66 to step over one position and thereby bring the next compartment loaded with bobbins into position over the slot 85 in plate 84 and thus permit the bobbins to feed into the chute.

Chute 67 is made in the form of a quadrant with its upper feed-in end substantially horizontal and its lower discharge end substantially vertical so that the bobbins are progressively changed in their positions from horizontal to vertical as they pass through the chute. Secured to the chute 67 at its discharge end is a light arcuate spring 101 which is adapted to engage the butt of each bobbin as it reaches the position ready for donning. This spring in conjunction with the force exerted by the remainder of the bobbins in the chute prevents the bobbin when in the donning position from dropping downward until it is given a light tap by a plunger 102 which is mounted in a vertical guide sleeve 103 disposed in line with and above the bobbin ready for donning. The actuating mechanism for plunger 102 includes the solenoid 69 mounted on the underside of chute 67 and which has a pivotally movable armature 104 articulated to one arm 105a of a lever. The other arm 105b of this lever extends upwardly and is connected by a pivot structure 106 to another lever 107 intermediate the ends of the latter. One end of this latter lever is pivotally mounted at 108 and the other end is connected with the plunger 102 so that when solenoid coil 72 is energized and its armature 104 is pulled in, lever 105a, 105b will be rocked clockwise as viewed in FIG. 3 and cause lever 105b to move in an arcuate path so as to pull downward on lever 107 and cause the plunger 102 to descend in guide sleeve 103 and strike the top of the bobbin thus releasing the butt from spring 101 whereupon the bobbin will drop down on the spindles.

Figure 16:
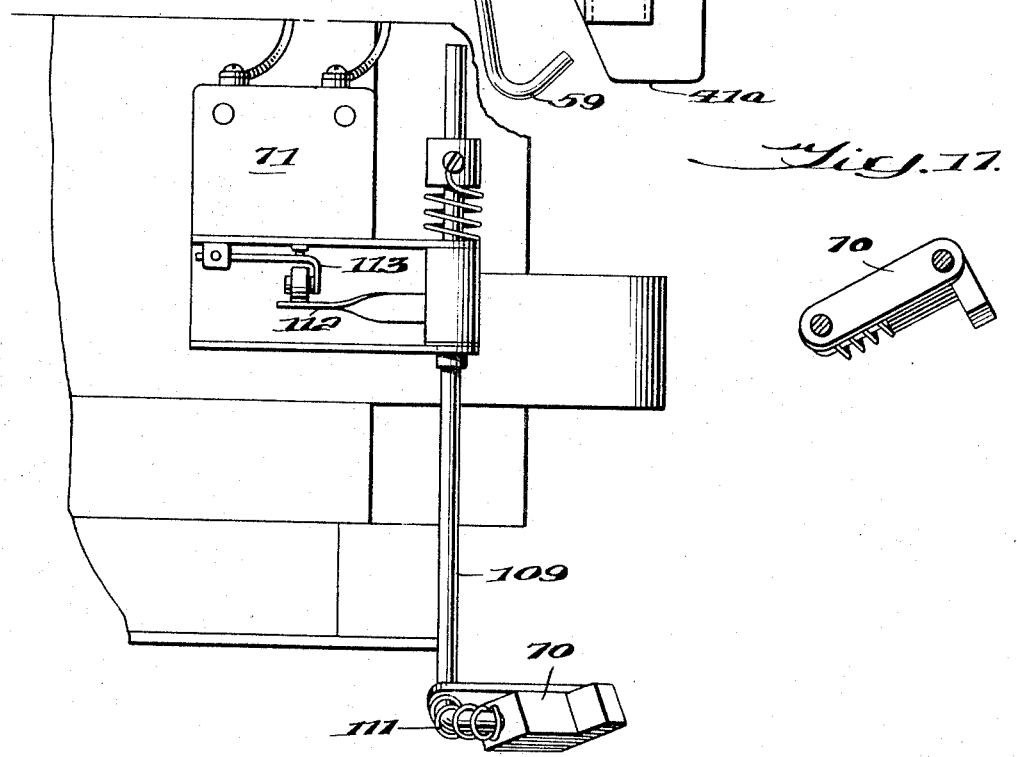
FIG. 16 is a vertical view of the spindle feeler mechanism.
Figure 17:
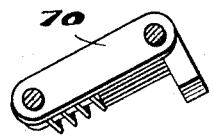
FIG. 17 is a perspective view of the donner feeler element.
Figure 8:
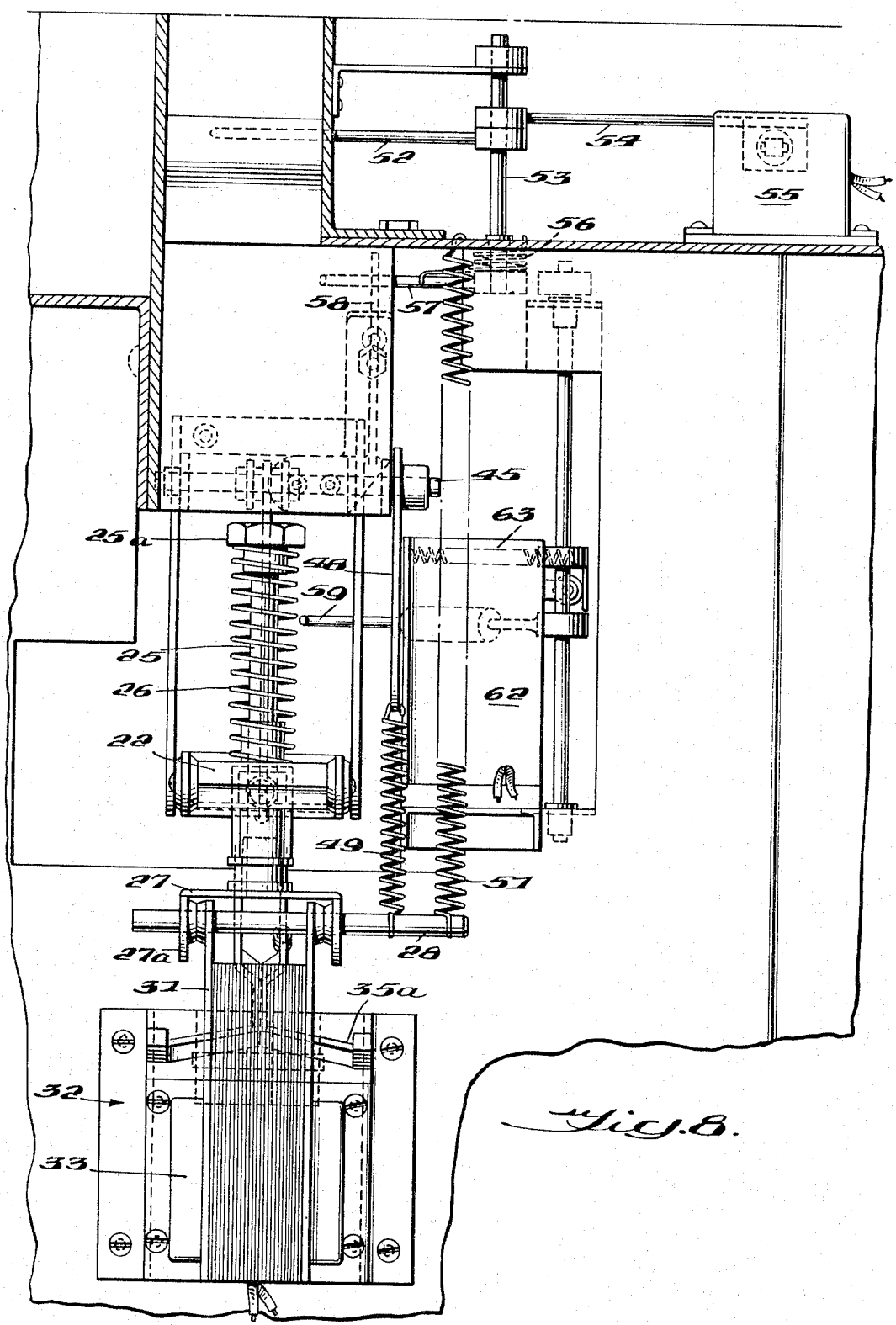
FIG. 8 is a rear view of a portion of the doffer mechanism.

When solenoid 72 is deenergized, a restoring, tension spring 110 having one end anchored and the other attached to lever arm 105b restores the levers, plunger and solenoid to the initial positions. Energization of solenoid coil 72 is controlled by a spindle feeler unit shown in detail in FIG. 16 which is placed in the path of the spindle so as to be struck by the latter, movement of the feeler in turn causing the contacts of switch 71 to close, this switch being connected in the energizing circuit of solenoid coil 72. The spindle feeler unit includes the feeler member 70 proper having an L-shaped configuration and which is preferably made from a plastic material. This L-shaped member is mounted on a horizontally projecting portion at the lower end of a rod 109 in such manner as to be able to pivot downwardly when struck by the bobbin as the latter is released from the donning position and to move back to its initial position under the action of a restoring spring 111 after bobbin has dropped down far enough on the spindle to clear the feeler. The rod 109 is mounted for rotation about a vertical axis from a spring biased position as the feeler 70 is actuated and is provided with a laterally projecting arm 112 which engages the contact actuating mechanism 113 of switch 71.

As shown in FIGS. 3 and 13–15 chute 67 is preferably constructed and mounted so as to be slidable horizontally in a direction normal to the line of spindles from a donning position wherein an empty bobbin is held at the discharge end of the chute directly above the spindle to a rearward position wherein the discharge end of the chute will be certain to clear the end structure of the spinning machine which projects somewhat outward from the spindle line. Also, this rearward movement of the chute is desirable to enable the chute to safely clear and pass by without a donning action, any spindle having a full bobbin thereon and which may have been missed by the doffer unit which operates in advance of the donner unit. Accordingly, the chute 67 is mounted on a horizontal elongated plate 114 which is guided for movement longitudinally of itself in a direction normal to the spindle line by means of several sets of rollers. Two roller sets 115, 116 arranged in spaced relation along the plate engage the opposite side edges thereof, two other roller sets 117, 118 also arranged in spaced relation along the plate engage the lower face of the plate, and another roller 119 located intermediate the roller sets 117, 118 engages the upper face of the plate 104. A biasing tension spring 121 having one end anchored and the other end secured to the plate 114 serves to normally maintain the plate 114 and hence chute 67 in the forward, donning position, and the plate and chute thereon are shifted rearwardly by energization of a solenoid 122 the armature 123 of this solenoid being provided with an extension rod 124 that is engaged with the rear end of plate 114. Energization of solenoid coil 125 is controlled by means of a feeler 126 positioned in advance of the donner feeler 70 and located at a height sufficient to clear the upper end of an empty spindle but which will be contacted by the upper portion of any full bobbin which may have been left on a spindle due to some failure of the doffer unit to properly doff. Feeler 126 when contacted by a full bobbin actuates a switch 127 having its contacts connected in the energizing circuit of solenoid coil 125 so that the latter is energized and pulls in its armature 123 and hence retracts the slide and chute against the restoring action of spring 121. Donner feeler 70 is thus also retracted since this is supported by the chute 67 and is prevented from being actuated so that no empty bobbin is released from the discharge end of the chute.

It has been explained that the upper, entrance end of chute 67 is normally located in registration with an elongated slot 85 in plate 84 through which the empty bobbins pass from a compartment in the magazine into the chute. To prevent fouling of the bobbins at this slot, an arrangement is provided wherein slot 85 is closed off each time chute 67 is retracted from its donning position. The slot close-off mechanism, shown in detail in FIGS. 10–12 comprises an elongated flat plate 128 having one end thereof articulated to one end of a pivoted link 129 and the other end articulated to one arm 131a of a bellcrank lever 131. The opposite end of link 129 is connected by a pivot pin 132 to a bracket 133 which is secured to a wall of chute 67. Bellcrank lever 131 is pivotally mounted on a pivot pin 134 which depends from plate 84. The other arm 131b of lever 131 is engaged by a pin 135 which is secured by bracket 136 to the rearward end wall of chute 67. When the chute is located in the forward, donning position which is the position depicted in the drawing, the close-off plate 128 will be located in the position shown in full lines at one side of the slot 85 and registering inlet to the chute and therefore does not interfere with the free transfer of bobbins through the slot into chute. However, when the chute is retracted from the donning position by movement in a direction to the right as viewed in FIG. 11, bellcrank lever 131 will be shifted in a counter-clockwise direction against the restoring action of a biasing spring 137 so as to shift the close-off plate 128 into the position indicated in broken lines where it blocks off slot 85 and holds the lowermost bobbin in such a position as not to interfere with movement of the chute. As soon as feeler 126 passes by the full bobbin on the spindle and releases the contacts on switch 127 to thus open the circuit between solenoid coil 125 and its source of power, chute 67 will move back into the donning position, and the restoring action of spring 137 will shift bell-crank lever 131 to its initial position thus shifting the close-off plate 128 back to its initial position and unblock the slot so that bobbins in the magazine compartment can drop through the slot into the chute. The same retracting action of the chute also takes place as the feeler is contacted by any obstructing portion at the end of the spinning frame so as to permit the chute to pass safely by the obstruction without being damaged.

*Full bobbin loader*

As the full bobbins are doffed from their spindles in succession as the doffer and donner mechanism travels longitudinally of the frame and delivered one after the other into the discharge chute 64, it is preferred in accordance with the invention to provide an arrangement for stacking them in a container in an orderly manner and in like oriented positon. With reference now to FIGS. 18 and 19 it will be seen that the delivery end of chute 64 terminates in a horizontally disposed outlet 138 which communicates through a corresponding slot 139 in conveyor housing 140 with pockets of an endless conveyor belt 142 which is arranged in accordance with the invention for motion in timed relation with the doffing cycle so that each pocket on the conveyor belt receives one doffed full bobbin during the interval that the belt is stopped, and is then restarted so as to present the next empty pocket to receive the next full bobbin that is doffed. The bobbins in the pockets in the upper flight of the belt are carried around one end of the belt and along the lower flight and deposited in a selective manner in compartments 143 provided in a box-like container 144, these compartments being established by parallel spaced vertical partitions 145.

In order to make certain that the bobbins will be deposited in the container in a generally horizontal position and with all bobbins oriented in the same direction as regards their top and bottom ends, the container 144 is provided with a movable floor which is lowered in a step-by-step manner from a position just below the top edge of the container to a final lower position below the bottom wall of the container thus permitting the container when full of bobbins in every compartment to be removed and replaced with an empty one.

The movable floor for the container is comprised of a pair of horizontally disposed parallel spaced rods 147 which extend through a slot in one of the end walls of the container for a distance equal to the length of the container. The partition members 145 in the container are interrupted at the central portions as shown in FIG. 19 to permit the rods to pass downwardly therethrough. Carried by the rods and arranged transversely thereto are plates 148 one such plate being located in each of the several compartments and serving as the floor for that compartment.

The mechanism for lowering the rods and the floor plates carried thereby is located at the left end of the container and is shown generally in FIG. 18. The details of construction of this floor lowering mechanism are shown in FIGS. 20–23 wherein it will be seen that the ends of rods 147 are secured to and terminate at one face of plate 149. Attached to the opposite face of plate 149 are two sets of rollers 151 which ride along the edges of two vertically disposed angle members 152, 153 for guiding the plate 149 and hence the rods 147 in a vertical direction. Extending from the rear face of plate 149 also are two parallel arms 154 and rollers 155 mounted on stub shafts 156 projecting inwardly from these arms to establish a rolling contact with the face portions of the two angle members 152, 153 thus holding the plate 149 and rods 147 on the angle members as well as assisting in the vertical guided movement.

Parallel spaced latching levers 157 are rotatably mounted on a pivot shaft 158 extending between the two arms 154 and a latch pin 159 extends between the outer ends of the levers 157 thus tying the latter together with the pin 159 for movement about the pivot shaft 158. A biasing tension spring 161 having one end anchored to plate 149 and the other secured to one of the latch levers 157 serves to bias the latch levers and latch pin in the direction toward the plate.

As seen in FIGS. 20, 22 and 23, corresponding faces 152a, 153a of the angle members are arranged parallel to each other and separated by an elongated flat sided strip 162 which is arranged for movement in a direction longitudinally of the angle members 152, 153. The faces of angle members 152, 153 are provided with notches 163 in vertical spaced relation and the slidable strip member 162 is also provided with like notches 164 with the same vertical spacing. A biasing spring 165 having one end anchored and the other secured to strip 162 serves to bias the latter in an upward direction and in such position that the notches 164 in the slidable strip member 162 are in registration with the notches 163 in the angle members 152, 153, and the latch pin 159 is adapted to engage in these notches when in registration, thus holding plate 149 and the rods 147 attached thereto at the height determined by the notches.

In order to drop plate 149 and rods 147 downwardly in a step-by-step manner from one notch to the next notch below, the invention provides an arrangement for shifting the middel strip 162 downwardly momentarily so as to force latch pin 159 out of the notches 163, 164, this action taking place as the angled edge 164a of the notch 164 moves downwardly against the latch pin 159. As soon as the latch pin 159 has cleared the notch, the assembly of plate and rods then fall by gravity. The restoring force of biasing spring 165 is such that the slidable strip 162 returns to its initial position wherein its notches 164 are in registration with those of the angle members 152, 153 and hence the plate and rod assembly will be stopped at the next-below notch position as the latch pin 159 which had been rolling against the edges of the angle members and strip member reaches and enters the notches next below.

A solenoid assembly 166 is utilized as the source of power for periodically driving the slidable strip 162 in the downward direction. This solenoid includes coil 167 and an armature 168 which is linked by rod 169 to an intermediate point along lever 171 which is pivotally mounted at one end thereof. The opposite end of lever 171 is pivotally secured to a lever 172 which is biased in a counter-clockwise direction by spring 173. The lower end of lever 172 is located in line with and adapted to strike a glancing blow downward against the upper end of the slidable strip 162 as the solenoid coil 167 is energized thus driving strip 162 downwardly. To make certain that strip 162 is returned to its initial position by the time that the plate and rod assembly 147, 148 has dropped to the next below notch position, it will be noted that lever 172 is provided with a laterally projecting stud 174 which is adapted to engage and slide along an inclined surface 175 at the top of angle members 152, 153. Thus as lever 172 is pulled downwardly it will also be cammed away from the top of the strip 162 after striking the latter with the necessary blow.

When the container 144 is empty the plate and rods assembly 147, 148 constituting the movable floor for the container is initially positioned at the upper most notch position, in which case the rods 147 and cross-plates 148 will be positioned a certain distance below the level of the top of the container which is located at the open, underside part of the casing enclosing the conveyor. Then as the full bobbins are brought one by one by the conveyor 142 to the left-most compartment 143 in the container as viewed in FIG. 18 they will fall into this compartment until no more bobbins can be accommodated. For example, three bobbins may drop into the left most compartment. The fourth bobbin will be carried by the conveyor across the left-most compartment and drop into the next compartment as will also the fifth and sixth bobbins. The seventh bobbin will be carried to the third compartment from the left end, etc. until all of the eight compartments depicted have been filled with three bobbins each. There being no more room in any of the compartments with the movable floor assembly at this uppermost level, the next full bobbin will be carried to and strike against a feeler member 176 which actuates the contacts of switch 177 to a closed position thus completing a circuit shown in FIG. 24 between a voltage source and the solenoid coil 167 for energizing the latter which then initiates the operating sequence that has been described for lowering the floor assembly to the next notch level. Thus more room is immediately established in all of the compartments 143 for accommodating more full bobbins and this procedure is repeated in a step-by-step manner until the floor assembly reaches its lowermost position which is below the level of the bottom edge of the compartment walls thus enabling the now full container to be readily removed from the supporting chassis 178 which also supports the conveyor 142, and replaced with an empty one.

The conveyor or transfer belt 142 can be run continuously if desired, or running of the belt can be coordinated to the doffing cycle so that the belt is stopped momentarily each time a bobbin is doffed in order that each bobbin will be accommodated in a separate compartment established by partition members 179 spaced along the belt. FIG. 25 illustrates schematically one practical arrangement for attaining the latter mode of belt operation. There it will be seen that the belt 142 is driven by a motor 180 through an intermediate magnetic clutch 181. In this arrangement the bobbin feeler member 52 when contacted by a full bobbin does not actuate the single contact switch 55 as previously described but rather is associated with a switch having a blade 182 actuatable by the feeler member 52 between stationary contacts 183, 184. When feeler member 52 is not engaged by a full bobbin B, blade 182 is engaged with contact 183 so as to complete an energizing circuit from a power source indicated by terminals 185 over conductor 186 to the magnetic clutch 181 whereby belt 142 is then driven from motor 180 which runs continuously. As soon as feeler member 52 is actuated by a full bobbin B, the circuit from power source 185 to contact blade 182 is transferred from stationary contact 183 to contact 184 thus energizing the solenoid coil 33 for the bobbin lifter mechanism so as to initiate the doffing cycle. The energizing circuit to the magnetic clutch 181 to keep the belt 142 running, however, is still maintained through a conductor 186' which extends from contact 184 to the blade 187 of another switch which is normally engaged with a stationary contact 188 and a conductor 189 leading from contact 188 to the magnetic clutch 181. Switch contact blade 187 is actuatable by a feeler member 190 as soon as the latter is struck by one of the partition members 179 on belt 142, thus opening the energizing circuit to magnetic clutch at switch contacts 187, 188 and stopping the belt 142 in such position that a compartment between adjacent partitions is located directly beneath bobbin outlet 138 from chute 64. Thus operation of the belt 142 is made interdependent upon the doffing cycle. As soon as a doffing cycle has terminated, the belt 142 is automatically restarted since by that time feeler member 52 has been released in the same manner as has already been described thus permitting blade 182 to reestablish engagement with contact 183 to again energize magnetic clutch 181 over conductor 186.

In conclusion, it is to be understood that while I have described and illustrated a preferred embodiment of my invention, various modifications may be made therein in the construction and arrangement of parts without, however, departing from the spirit and scope of the inventive concept as defined in the appended claims.

I claim:

1. Apparatus for doffing full bobbins in succession from a line of spindles on a textile working machine comprising a support structure arranged to travel along the line of spindles, a bobbin lifter mechanism including a lifter arm movable between a retracted position clear of the spacers between the spindles and an extended position engaging the bobbin to be doffed, an electro-responsive actuating means coupled to said bobbin lifter mechanism, an energizing circuit for said electro-responsive actuating means, a switch having its contacts arranged in said energizing circuit, and a bobbin feeler member located in the path of and actuatable by the bobbin to be doffed for controlling said bobbin switch contacts to thereby control actuation of said bobbin lifter mechanism.

2. Apparatus for doffing full bobbins in succession from a line of spindles on a textile working machine comprising a support structure arranged to travel along the line of spindles, a bobbin lifter mechanism including a lifter arm movable between a retracted position clear of the spacers between the spindles and an extended position engaging the bobbin to be doffed, a solenoid having its armature coupled to said bobbin lifter mechanism for actuating the same, an energizing circuit for said solenoid, a switch having its contacts arranged in said energizing circuit, and a bobbin feeler member located in the path of and actuatable by the bobbin to be doffed for controlling said switch contacts to thereby control energization of said solenoid and actuation of said bobbin lifter mechanism.

3. Apparatus as defined in claim 2 and which further includes means actuated by said bobbin lifter mechanism for holding said bobbin feeler member against a return movement after being released from the bobbin.

4. Apparatus as defined in claim 2 and which further includes a second switch having normally closed contacts arranged in said energizing circuit, and a second feeler member located in the path of and actuatable by the spacer located between adjacent spindles to actuate the contacts of said second switch to an open position thereby deenergizing said solenoid.

5. Apparatus for donning empty bobbins in succession on a line of spindles of a textile machine comprising a support structure arranged to travel along the line of spindles, a magazine containing a supply of empty bobbins mounted on said traveling support structure, means for feeding the empty bobbins in succession from said magazine to a vertical donning position located directly above the spindle line, an electro-actuated plunger located directly above said vertical donning position, switch means in an energizing circuit for said plunger, and a spindle feeler member located in the path of and actuatable by the spindle to effect actuation of said switch means and hence, energization of said plunger so as to strike downwardly upon and effect release of an empty bobbin from said donning position so as to drop vertically onto the spindle.

6. Apparatus for donning empty bobbins in succession on a line of spindles of a textile machine comprising a support structure arranged to travel along the line of spindles, a magazine having a plurality of compartments each containing a supply of empty bobbins mounted on said traveling support structure, a transfer chute having an entrance and communicable selectively with the compartments in said magazine and a vertically disposed discharge end located directly over the spindle line, a spindle feeler member located in the path of and actuatable by the spindle, means controlled by actuation of said spindle feeler member for releasing an empty bobbin from said discharge end of said chute so as to drop vertically onto the spindle, a bobbin feeler member arranged on said transfer chute for actuation by the bobbins in said chute, and means controlled by actuation of said bobbin feeler member for shifting said magazine in a step-by-step manner so as to bring the compartments therein successively into communication with said entrance end of said transfer chute.

7. Apparatus for donning empty bobbins in succession on a line of spindles of a textile machine comprising a support structure arranged to travel along the line of spindles, a magazine containing a supply of empty bobbins mounted on said traveling support structure, a transfer chute having an entrance end communicating with a bobbin outlet from said magazine and a vertically disposed discharge end located directly above the spindle line, a spindle feeler member located in the path of and actuatable by the spindle, means controlled by actuation of said spindle feeler member for releasing an empty bobbin from said discharge end of said chute so as to drop vertically onto the spindle, means for shifting said transfer chute in a direction normal to the spindle line so as to shift the discharge end thereof away from the line of spindles, a second feeler member located in the path of and actuatable by any full bobbin which may be on the spindle onto which the next empty bobbin would normally be dropped, and means controlled by actuation of said second feeler member for actuating said transfer chute shifting means.

8. Apparatus as defined in claim 7 and which further includes means closing off communication between the entrance end of said transfer chute and the bobbin outlet from said magazine whenever said transfer chute is shifted away from said line of spindles.

9. In combination with a doffer mechanism for doffing full bobbins in succession from a line of spindles on a textile working machine and delivering the full bobbins through a chute, a generally horizontal compartmented transfer conveyor belt of the endless type positioned at the discharge end of said chute for receiving the bobbins into the compartments on the upper flight of said conveyor belt, a compartmented container located adjacent the lower flight of said conveyor belt for receiving the full bobbins as they are released from the belt compartments, a movable floor for the container compartments, and means for lowering said floor in a step-by-step manner.

10. Apparatus as defined in claim 9 wherein said means for lowering said floor are actuated by a step-mechanism controlled by a feeler member adapted to be engaged by a full bobbin unable to drop into any of the container compartments.

11. Apparatus as defined in claim 9 wherein said movable floor is comprised of floor members individual to the container compartments and carried by a support slidably downward in a step-by-step manner, said support including a latch mechanism cooperative with vertically spaced latch receiving means on a vertical support mechanism.

12. Apparatus as defined in claim 11 wherein said vertical support mechanism includes a stationary element and a vertically movable element, said stationary and movable elements including notches adapted for movement into and out of registration, said notches when out of registration serving to permit said latch mechanism and movable floor to slide downwardly upon said elements and when in registration serving to catch and hold said latch mechanism and movable floor at the height determined by the notches.

13. In combination with a doffer mechanism for doffing full bobbins in succession from a line of spindles on a textile working machine and delivering the full bobbins through a chute, a generally horizontal compartmented transfer conveyor belt of the endless type positioned at the discharge end of said chute for receiving the bobbins into the compartments on the upper flight of said conveyor belt, a container located adjacent the lower flight of said conveyor belt for receiving the full bobbins as they are released from the belt compartments, and means operating said conveyor belt in an intermittent manner coordinated with operation of the doffer mechanism to stop said conveyor belt with a compartment thereof in registration with the discharge end of said chute.

14. Apparatus as defined in claim 13 wherein said conveyor belt is driven by a motor through a magnetic clutch, and which includes a feeler member actuated by partition members on said belt for deenergizing said magnetic clutch.

References Cited by the Examiner

UNITED STATES PATENTS

| 2,129,660 | 9/1938 | Abbott | 57—53 X |
| 2,452,910 | 11/1948 | Davidson | 57—88 |
| 2,886,940 | 5/1959 | Urano et al. | 57—53 |
| 2,961,822 | 11/1960 | Prat | 57—53 |

MARVIN STEIN, *Primary Examiner.*

RUSSELL C. MADER, *Examiner.*